United States Patent
Bowman

[11] Patent Number: 5,609,765
[45] Date of Patent: Mar. 11, 1997

[54] STEAM STRIPPING METHOD FOR THE SOFTENING OF WATER

[76] Inventor: Ronald W. Bowman, 5574-B Everglades St., Ventura, Calif. 93003

[21] Appl. No.: 567,323

[22] Filed: Dec. 5, 1995

Related U.S. Application Data

[63] Continuation-in-part of Ser. No. 246,039, May 19, 1994, abandoned.

[51] Int. Cl.$^6$ .................................................. C02F 1/20
[52] U.S. Cl. .................. 210/638; 210/639; 210/651; 210/665; 210/666; 210/714; 210/718; 210/724; 210/727; 210/737
[58] Field of Search .................................... 210/636–639, 210/649, 650, 651, 665, 687, 666, 714, 727, 718, 724, 725, 737, 774

[56] References Cited

U.S. PATENT DOCUMENTS

| | | | |
|---|---|---|---|
| 1,860,781 | 5/1931 | Liebknecht | 210/30 R |
| 2,401,924 | 6/1946 | Goetz | 210/714 |
| 3,583,910 | 6/1971 | Stoddard | 210/737 |
| 3,976,569 | 8/1976 | Sheppard et al. | 210/724 |
| 4,276,180 | 6/1981 | Matson | 210/699 |
| 4,366,066 | 12/1982 | Rogers et al. | 210/737 |
| 4,518,505 | 5/1985 | Lim et al. | 210/737 |
| 4,663,054 | 5/1987 | O'Connell et al. | 210/737 |
| 4,670,150 | 6/1987 | Hsiung et al. | 210/636 |
| 4,865,742 | 9/1989 | Falletti | 210/637 |
| 4,888,115 | 12/1989 | Marinaccio | 210/636 |
| 4,966,707 | 10/1990 | Cussler et al. | 210/632 |
| 4,970,001 | 11/1990 | Sheehan | 210/638 |
| 4,976,867 | 12/1990 | Callahan | 210/637 |
| 5,152,904 | 10/1992 | Kedem et al. | 210/711 |

*Primary Examiner*—Peter A. Hruskoci
*Attorney, Agent, or Firm*—Harrison & Egbert

[57] ABSTRACT

A steam stripping method for the softening of a feedstream of water including the steps of passing the feedstream of water into intimate contact with uncondensed steam such that the steam elevates the temperature of the feedstream of water, increasing the pH of the feedstream of water, reacting the feedstream of water with the steam so as to produce uncondensed steam byproducts and liquid byproducts, and passing the liquid byproducts through a filter so as to remove solids from the liquid byproducts. The steam is reacted with the feedstream of water at a rate of one pound of steam per ten pounds of feedstream water. A quantity of magnesium hydroxide can be added to the feedstream of water so as to initiate silica crystal formation. The liquid byproducts can pass through a bed of aluminum prior to the step of passing through a filter so as to reduce a silica content of the liquid byproducts. In the feedstream of water, a bicarbonate component is converted into a carbonate component at temperatures of less than boiling. Carbon dioxide is released as an uncondensed steam byproduct.

20 Claims, 3 Drawing Sheets

STEAM STRIPPING METHOD FOR THE SOFTENING OF WATER

RELATED APPLICATIONS

The present application is a continuation-in-part of U.S. patent application Ser. No. 08/246,039, filed on May 19, 1994, and entitled "STEAM STRIPPING METHOD FOR THE SOFTENING OF WATER", now abandoned.

TECHNICAL FIELD

The present invention relates to processes for the softening of water. More particularly, the present invention relates to steam stripping processes for the removal of hardness ions, acid gases, and silica.

BACKGROUND ART

Water softening processes are often carried out for the removal of dissolved, suspended and colloidal solids from water for the purpose of rendering it more useful for household and/or industrial use. The softening of water is carried out by the removal of hardness ions either by resin or through precipitation. Precipitation is a result of exceeding the solubility of the molecule and is usually caused by heat or a change in pH. In many feedstream waters, acid gases exist that must also be removed. Silica, another common ion, is also desirably removed from the feedstream waters, often through the use of resins.

Lime softening water treatment processes may date back to antiquity. In the modern era, prior to the 1930's, water softening was carried out as a four step process. First, the hard water was mixed with lime, or lime plus soda ash, in a mixing tank. Secondly, precipitation and flocculation takes place in one or more flocculation chambers. Third, flocculated water then flows into a settling chamber where precipitated sludge is allowed to settle to the bottom and is drawn from the bottom of the settling tank for disposal. A portion of the sludge so removed is recycled to the mixing tank in order to speed the softening reactions. Finally, clarified water overflows from the top of the settling chamber and is filtered.

One significant advance in lime softening water treatment processes was the development as what is known as the spaulding contact reactor. This reactor incorporated the above-noted mixing, flocculation, precipitation, and settling steps in a single reactor structure. However, separate conventional through-flow filtration equipment is generally still required in conjunction with the spalding reactor. Spaulding reactors are generally large, complex, cumbersome and, hence, quite costly in terms of capital investment.

The most common methods of acid gas removal from water streams are gas or steam stripping with the addition of caustic, resins, or crystallization as the common methods of softening. Crystallization is usually accomplished through the addition of crystals and heat on a thin film column which promotes the formation of the crystals for removal.

In the past, techniques have not been developed whereby acid gas stripping, partial hardness removal, and silica reduction have occurred in a single process. Where such steps are required, these contaminants of the feedstream of water are removed through separate and isolated processes. The addition of resins and other cleansing compounds to the water is a very costly procedure. Additionally, after these resins are added to the water, there is no reuse of the resins.

U.S. Pat. No. 4,670,150, issued on June 2, 1987, to Hsing et al. describes a method for softening a fluid containing hardness constituents which includes the steps of: (1) mixing the fluid with sufficient amounts of a softening agent, and previously precipitated hardness constituents, in a reactor to establish a softening reaction in the reactor for precipitating a substantial portion of the hardness constituents contained in the fluid; (2) removing a portion of the fluid and precipitated hardness constituents from the reactor as a slurry and filtering the slurry through a cross-flow microfiltration module containing at least one elongated filtration tube, whereby substantially all of the precipitated hardness constituents are removed from the portion of the fluid exiting from the module as filtrate; and (3) returning at least a portion of the filtered out precipitated hardness constituents exiting from the module to the reactor as the previously precipitated hardness constituents.

U.S. Pat. No. 4,518,505, issued on May 21, 1985, to Lim et al. describes a process for heating and softening of hard water by direct heat exchange with steam. The steam is directly sparged into the hard water within a reaction zone and condensed in the water under a pressure sufficient to prevent boiling at the reaction zone temperature. The heated water is then drawn from the reaction zone without substantial vaporization of water and filter to remove scale precipitates resulting from the heating step. At least a portion of the softened water is heated to generate wet steam which is then recirculated to the reaction zone and sparged into the hard water therein.

The Lim patent describes a process for the condensing of steam rather than softening water by way of steam stripping. In the Lim patent, a high temperature must be used (374° F. to 410° F.) as the steam is condensed in order to convert the bicarbonate to carbonate. In the method of the Lim patent, it is very important to heat the water first, since the reaction is driven by the high temperature and not by the removal of carbon dioxide. No mechanism is provided in the Lim patent to strip the carbon dioxide. U.S. Pat. No. 2,401,924, issued on Jun. 11, 1946, to P.C. Goetz describes a process for the removal of silica from water. The Goetz patent describes the treatment of water for removing silica therefrom by utilizing a magnesium-rich sludge which is brought into an intimate, thorough and prolonged contact with the water while the water is at a temperature above about 50° C. The sludge is obtained by the precipitation of calcium and magnesium salts from hard water by the addition thereto of lime and soda-if needed, or other suitable chemicals as in the hot lime soda process of water softening. In this patent, the magnesium hydroxide is used to adsorbing the silica. The majority of the silica is removed by magnesium silicate or a complex magnesium silicate scale. Some magnesium hydroxide can occur depending no the relative solubility constants. Silicate scales are less soluble than carbonate, hydroxides or sulfates.

It is an object of the present invention to provide a process for the softening of water that is effective for the reduction in hardness ions, silica, and acid gases.

It is another object of the present invention to provide a process which is more economically attractive than previous processes.

It is a further object of the present invention to provide a process for the softening of a feedstream of water that produces large energy savings.

It is another object of the present invention to provide a process for the conversion of bicarbonate to carbonate at temperatures below boiling.

3

It is another object of the present invention to provide a process which strips carbon dioxide from the feedstream of water.

It is a further object of the present invention to minimize heat and energy requirements of the softening process.

These and other objects and advantages of the present invention will become apparent from a reading of the attached specification and appended claims.

SUMMARY OF THE INVENTION

The present invention is a method for the softening of a feedstream of water that comprises the steps of: (1) passing the feedstream of water into intimate contact with uncondensed steam such that the steam elevates the temperature of the feedstream of water; (2) increasing the pH of the feedstream of water; (3) reacting the feedstream of water with the steam to increase the temperature of the water to a maximum of between 150° F. and 250° F. and to produce uncondensed steam byproducts and liquid byproducts; and (4) passing the liquid byproducts through a filter so as to remove solids from the liquid byproducts.

The steam is reacted with the feedstream of water at a rate of one pound of steam per ten pounds of feedstream water. The step of increasing the pH is carried out prior to the step of reacting the feedstream of water with the steam.

The steam has a pressure of between 100 to 450 p.s.i. The liquid byproducts have a maximum temperature of between 150 and 220° F. following the step of reacting. In the step of reacting a bicarbonate component of the feedstream of water is converted to carbonate at a temperature of below 225° F. In addition, carbon dioxide is released as an uncondensed steam byproduct.

In the present invention, a quantity of magnesium hydroxide is added to the feedstream of water so as to initiate silica crystal formation.

The liquid byproducts can be passed through a bed of aluminum prior to the step of filtering so as to reduce a silica content of the liquid byproducts. The uncondensed steam byproducts of the process can be delivered to a downstream process.

In an alternative embodiment of the present invention, the feedstream of water can be passed through a crossflow microfilter tube and uncondensed steam is sparged to an interior of the crossflow microfilter tube. This steam enters the tube through pores formed through the tube.

DETAILED DESCRIPTION OF THE INVENTION

Figure 1:
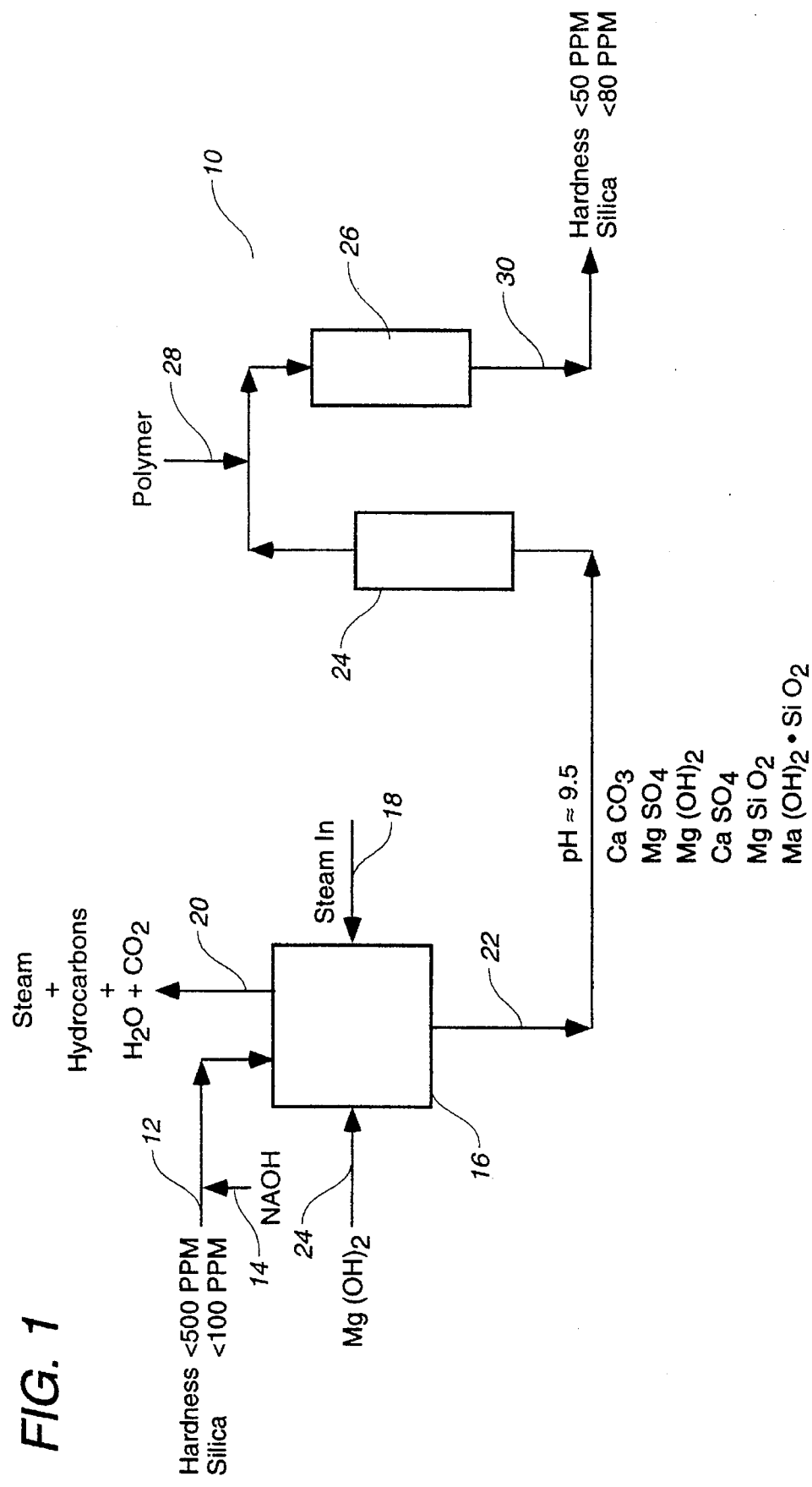
FIG. 1 is a block diagram of the process of the present invention.

Referring to FIG. 1, there is shown at 10 the process of the present invention for the softening of a feedstream of water. In the process 10, the feedstream 12 of water enters the system from an exterior location. The sources of the feedstream of water can include steamflood enhanced oil recovery water and trona tailing pond water. These sources of water have very high total dissolved solids (TDS). In particular, these sources of water have a bicarbonate component. As such, it is important to be able to strip the acid gases, remove the hardness ions, and reduce the silica before the water can be appropriately processed. The feedstream 12 which enters the process 10 will have a hardness in excess of 500 parts per million and a silica content in excess of 100 parts per million.

Figure 2:
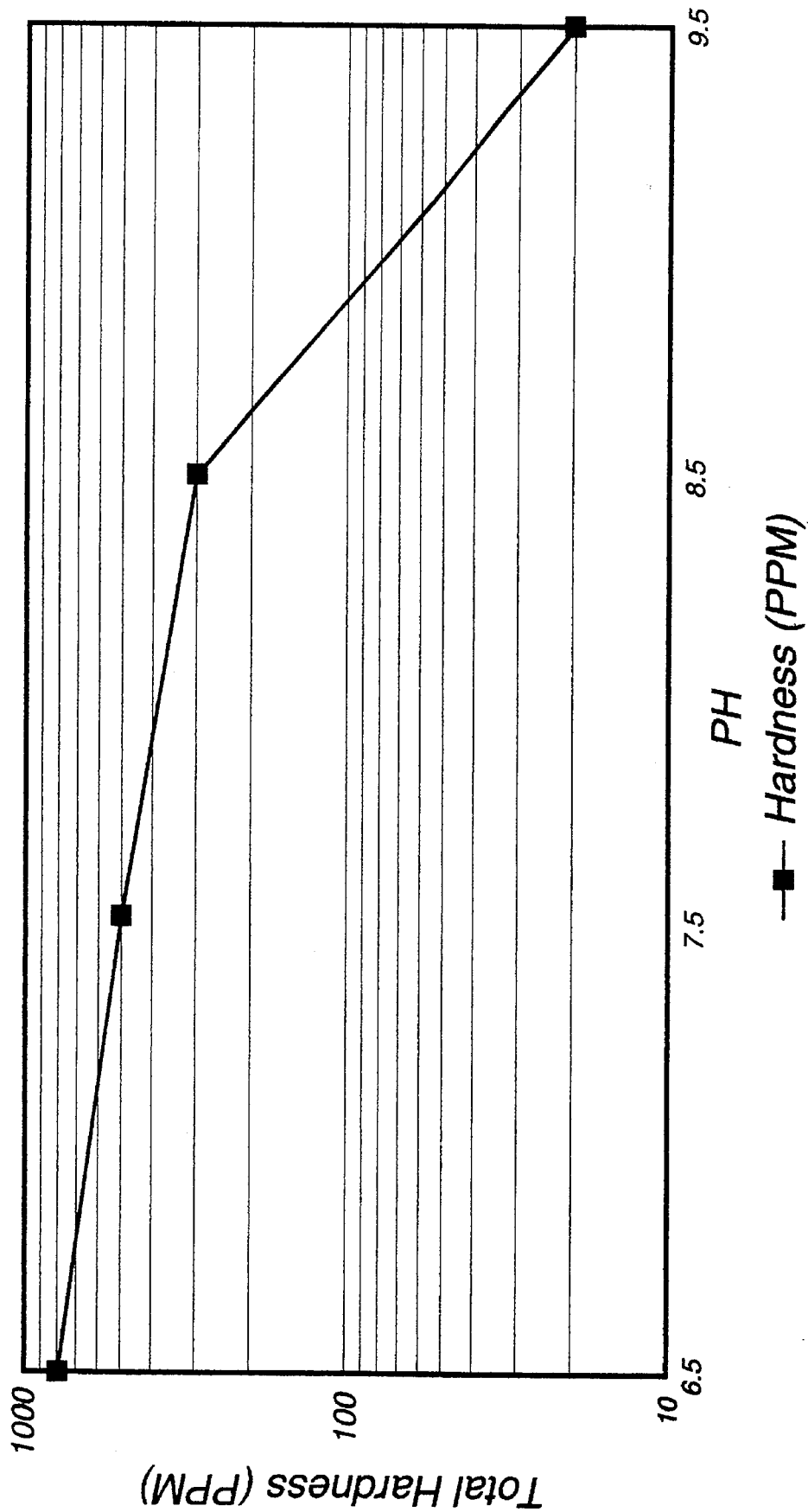
FIG. 2 is a graphical representation of the relationship of hardness and pH.

Initially, the pH of the feedstream 12 is increased by the addition of sodium hydroxide flow 14. The sodium hydroxide flow 14 is a caustic that enters the feedstream 12. The pH of the feedstream 12 could also be increased through the addition of some other caustic or through the use of high pH blowdown water. The feedstream 12 of water, along with the caustic flow 14, enters a mixing chamber 16. The mixing chamber 16 is designed so as to cause the intimate contact between the feedstream 12 and a flow of uncondensed steam 18. Steam flow 18 enters the mixing chamber 16 for the purpose of mixing with the feedstream 12 and also for elevating the temperature of the water in the feedstream. The steam can be either low pressure steam or high pressure steam. The source of the steam is relatively easy to obtain at many process facilities. For example, the steam flow 18 can be a low pressure waste steam, can be high pressure water which can be flashed so as to produce low pressure steam, or can be the direct application of high pressure steam. In the preferred embodiment of the present invention, the steam flow 10 is added to the feedstream 12 of water at a rate of about ten pounds of water per one pound of steam. This process breaks down the alkalinity of the feedstream 12 so as to increase the pH. The use of the caustic flow 14 also serves to increase the pH. FIG. 2 illustrates the relationship of hardness removal in relationship to pH. FIG. 2 shows this relationship when the steam flow 18 has increased the temperature of the feedstream 12 to 200° F.

When the steam 18 has fully reacted with the feedstream 12, uncondensed steam byproducts 20 and liquid byproducts 22 will exit the mixing chamber 16. It is important to note that, in the process of the present invention, the steam does not condense into the feedstream of water. The steam serves to elevate the temperature of the water to a level such that the bicarbonate component is converted into a carbonate component and such that carbon dioxide is released as a result of the reaction. The uncondensed steam byproducts include steam, hydrocarbons, water, and carbon dioxide. When the liquid byproducts 22 exit the mixing chamber 16, the liquid byproducts will have a pH of approximately 9.5.

A flow 24 of magnesium hydroxide can be added to the chamber 16 so as to mix with the reaction of the steam 18 and the feedstream 12. The magnesium hydroxide flow 24 is preferable for use in conjunction with a feedstream of low sulfate water with magnesium. The use of the magnesium hydroxide flow 24 is believed to initiate the crystal formation. At pHs below 12, much of the silica is removed via adsorption on magnesium hydroxide rather than magnesium silicate.

As can be seen in FIG. 1, the liquid byproducts 22 includes components such as $CaCO_3$, $MgSO_4$, $Mg(OH)_2$, $CaSO_4$, $MgSiO_2$, and $Ma(OH)_2$. $SiO_2$. The following reactions are carried out through the steam stripping process occurring in the mixing chamber 16:

$2NaHCO_3 + HEAT + STEAM > Na_2CO_3 + CO_2 + H_2O$

$Na_2CO_3 + H_2O + HEAT + STEAM > 2NaOH + CO_2$

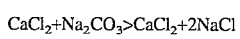

$CaCl_2 + Na_2CO_3 > CaCl_2 + 2NaCl$

$MgCl_2 + 2NaOH > Mg(OH)_2 + 2NaCl$

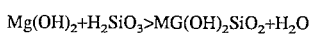

$Mg(OH)_2 + H_2SiO_3 > MG(OH)_2SiO_2 + H_2O$

The liquid byproducts 22 pass through an aluminum bed 24 after leaving the mixing chamber 16. The aluminum bed 24 is, in particular, used for high sulfate waters with magnesium. The hot liquid byproducts 22, after the steam stripping, are passed through the bed of aluminum 24 prior to being filtered at filter 26 in order to reduce the silica. The bed 24 is utilized because the addition of magnesium hydroxide must act as a crystal initiator since the amount of magnesium hydroxide added is not sufficient for the total silica reduction required. In those circumstances where the sulfate content of the feedstream 12 is not high, then the bed 24 of aluminum would not be required.

A polymer flow 28 is introduced to the liquid byproducts for the purpose of facilitating the flocculation of the solids from the liquid byproducts. The filter 26 serves to remove the solids from the liquid byproducts 22. The liquid byproducts 22 exit at 30 for use elsewhere in the system. Upon exiting the process 10, the liquid byproducts will have a hardness of less than 50 parts per million and a silica content of less than 80 parts per million.

The present process has been used on 7,000 TDS steamflood enhanced oil recovery water for recycle and on the high TDS tailing pond water from trona production. Both hardness and silica has been reduced for both waters. In the 7,000 TDS water, the hardness is reduced from over 1000 parts per million as $CaCO_3$ to below 50 parts per million and silica from over 200 parts per million to below 100 parts per million. In the trona tailing pond water, similar reductions were achieved. The trona tailing pond water used the aluminum bed 24 since the sulfate content of the inlet water stream was high.

Downstream of this steam stripping process 10, a water softener can be utilized for boiler of steam generator operation. Steam stripping applications have better economics over strong acid/weak acid resin softening, hot lime, or warm caustic whenever the following are available: (1) low pressure waste steam, (2) high pressure water which can be flashed to produce low pressure steam, or (3) high pressure steam which can be used in a downstream process. Process 10 of the present invention provides more efficient silica removal than competing systems. The steam byproducts 20 can be delivered, as needed, for use elsewhere within the industrial process.

Figure 3:
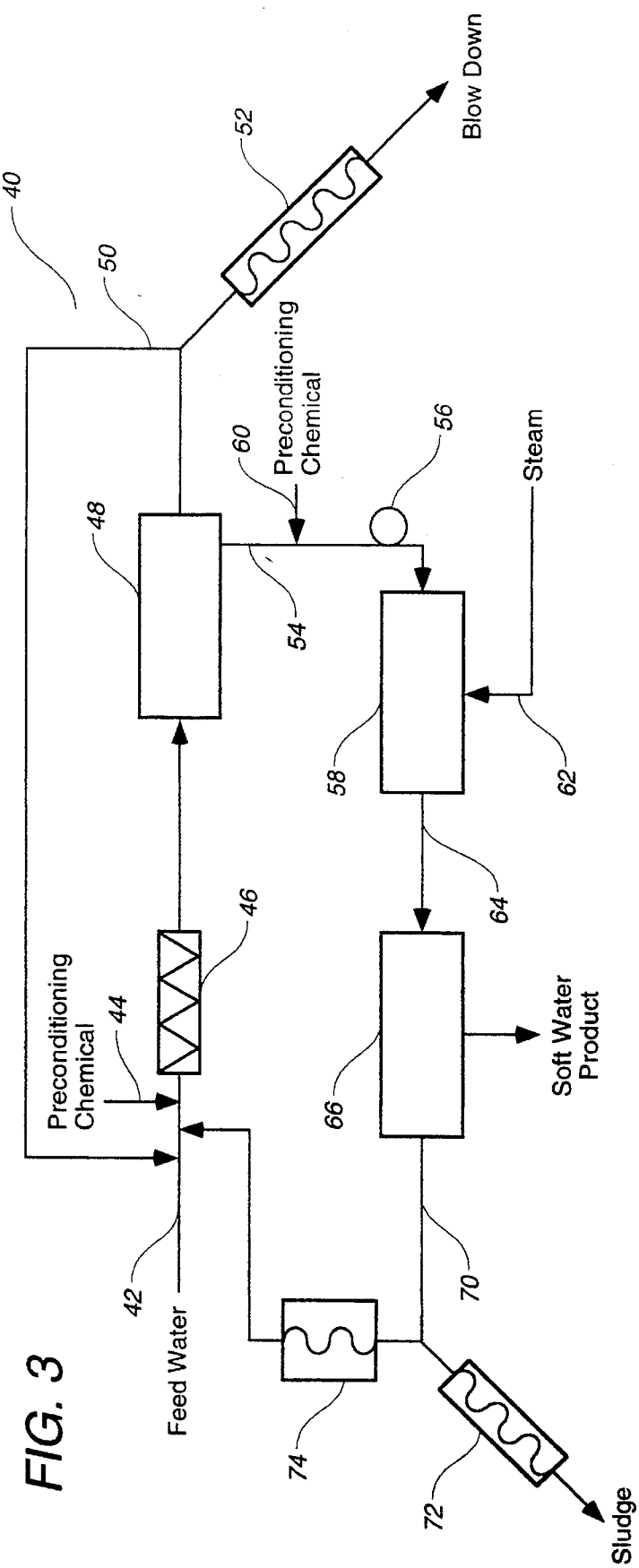
FIG. 3 is a block diagram of an alternative process in accordance with the present invention.

FIG. 3 shows an alternative embodiment of the process 40 of the present invention. In FIG. 3, heated feed water (140° F. to 150° F.) is initially passed into the system along line 42. Preconditioning chemicals, such as a caustic, enter through flowline 42. The feed water 42 and the preconditioning chemicals 44 enter a static mixer 46. The feed water 42 is initially passed to a crossflow microfilter module 48. Crossflow microfilter modules are known in the prior art for the separation of liquids and solids. In this case, the solids recycle through the system along line 50 after exiting the crossflow microfilter module 48. The blowdown of the recycle line 50 passes through heat exchanger 52. The liquid component of the feed water 42 exits the crossflow microfilter at line 54. A pump 56 passes a liquid filtrate to another crossflow microfilter tube 58. Preconditioning chemicals, such as magnesium hydroxide, can enter the flowline 54 through line 60. Uncondensed steam is delivered to the water in the crossflow microfilter module 58 through steam line 62. Steam is delivered to the crossflow microfilter 58 in a ratio of one pound of steam per ten pounds of water. The steam is sparged to an interior of the crossflow microfilter tube 58 through pores formed on an exterior surface of the tube 58. The crossflow microfilter module 58 can be a ceramic or stainless steel crossflow microfiltration tube having a pore diameter in a range of 0.2 to 20 microns. Steam is sparged from line 62 into the inside of the tube 58 through the permeate side of the membrane of the tube 58.

As such, the steam 62 comes into intimate contact with the water and the preconditioning chemical 60. The combination of the rapid temperature increase (from the intimate contact with the steam) in combination with the preconditioning chemicals cause many of the inorganics (which cause scaling in steam generators and other high quality water systems) to form as precipitates. Depending on the amount of organic material present, many of these compounds may also be removed by association or by direct precipitation. The precipitates and/or colloidal particles formed by the reactions caused by the steam sparging and the preconditioning chemicals are then removed by passing from the microfiltration tube 58 through line 64 at an elevated pressure (100 to 450 p.s.i.) and at an elevated temperature (150°–220° F.). This liquid passes into another crossflow microfilter 66. The outlet 68 of crossflow microfilter 66 is the soft water product of the process 40. This soft water product can be sent directly to a point of use with minimal pressure and/or heat loss. The remaining components of the process pass out of the system through line 70 to a heat exchanger 72 as blowdown of the sludge or pass through a heat exchanger 74 as part of the initial feedstream 42.

In the process 40, the ability to soften water at high temperatures and pressures results in a large energy savings in many applications. Energy can also be recovered from the solids blowdown and from the solids recycle as shown in FIG. 3.

The efficacy and efficiency of the present invention in comparison with the related prior art has been demonstrated by test results carried out at various temperatures and using various materials. The test results are summarized hereinbelow.

EXAMPLE 1

The water used in this first test was obtained from a cooling tower in a trona plant. As a result, there is some carbonate in the air and this gets entrained in the water. This served to raise the pH of the water above the normal 7.0.

It is known that at about 180° F., there is sufficient heat to force the equilibrium of bicarbonate component to the carbonate phase in the water. In the generation of steam, there is generally a vapor space present. This vapor space will allow carbon dioxide to escape from the solution phase. As noted, this shift from bicarbonate to carbonate occurs with carbon dioxide present in concentrations of 2 to 6%.

In the stripping tests that were conducted, steam was used at 35 psia. As with most steam, carbon dioxide was present in the steam, being generated from the breakdown of bicarbonate and carbonate during the generation phase. The steam that was used had a carbon dioxide content of 6% by volume. Based upon experience, 6% carbon dioxide seems to be the normal amount for most steam generation systems.

In this test, water was added to the steam stripping column at 9.3 pH, which contained approximately 30 p.p.m. of calcium and 15 p.p.m of magnesium. The initial water temperature was 50° F. and the steam temperature was 250° F. When the initial steam was added, the pH of the water condensed to 9.1 and there was no reduction in hardness at this point. This drop in pH was caused by the carbon dioxide in the steam. When sufficient steam had condensed to raise the water temperature to 180° F., the pH increased rapidly to pH 10.8 at a temperature of 250° F. At this point, the hardness was reduced and also there was a reduction in the magnesium. It was found that if one is going to condense steam to raise the water temperature, initially, the carbon dioxide will reduce some of the efficiency gained by the heat of condensation from the steam. This has only a momentary effect in the batch process and would be quickly overcome in a continuous phase system. It was noted that once the temperature reaches 180° F., there is a rapid conversion of the bicarbonate to carbonate apparent by the increase in the pH. This appears to be the conversion which occurs when there is some vapor space. Apparently, the equilibrium shift is much quicker when the carbon dioxide can escape into the vapor phase. If no vapor space is available, then temperatures must be much higher (374° to 410° F.) to get the conversion to take place.

EXAMPLE 2

Where the temperature is employed between 374° F. to 410° F., the heat of vaporization would be 1194 BTU/pound. In comparison, at 250° F., the heat of vaporization is 1164 BTU/pound. Thus, the heat of vaporization is not much different between the use of heat at 374°–410° F. and the use of heat at 250° F. The only reason for the use of high temperatures is when there is no vapor space for the direct transfer of the carbon dioxide directly into the gas phase.

EXAMPLE 3

Starting with water at 9.3 pH and incorporating steam stripping, rather than condensing the steam first, the pH begins to increase immediately upon start up of the system since the carbon dioxide is removed into the vapor phase. The equilibrium is shifted due to the release of the carbon dioxide. When steam stripping is used, one can shift the bicarbonate pH at a much lower temperature as demonstrated by the increase in pH at below 180° F. At temperatures above 180° F., the conversion takes place by both heat and stripping. The present invention as shown that it is possible to shift the bicarbonate to the carbonate by remaining below 225° F. and can reduce the hardness without ever boiling the water. It is apparent from tests carried out with the present process, one could even remove the carbon dioxide by gas stripping. However, the removal is somewhat temperature dependent. One would have to increase the temperature above the 60° to 70° F. range due to the increased solubility of the carbon dioxide at the lower temperature.

In this steam stripping test, it is noted that there was some hardness removal without the addition of any chemicals. In addition, there was some silica removal which, when tested, was amorphorous silica. With the addition of magnesium, the silica came down as magnesium silica scale. Based upon a mass balance, it would appear that 10% removal could be absorption on magnesium sulfate, but the other 90% was by removal in the form of complex silicates. It appears, based upon these results, that not all of the silica can be removed by absorption.

EXAMPLE 4

Further testing was conducted using alumina and by adding aluminum ions. This was done to compare the relative removal of the silica via absorption versus solubility of the ions and then precipitation. Once again, the absorption of the silica was about 12% versus the precipitation of aluminum silicate for the remaining 88%. Thus, complex silicate formation is much more controlling in the silica removal mechanism than is the removal mechanism by absorption.

The steam was also added to the water by way of a porous ceramic membrane. This was very effective in achieving intimate contact between the liquid and the steam with very fine dispersion of the steam into the liquid. This intimate contact accounted for a very efficient removal of the carbon dioxide. This showed even better results than through the use of column packing.

Tests were carried out on the filtering of the precipitated hardness, silica particulates, and other solids resulting from the steam stripping process. Both sand filters and microfilters were used and found to be effective in removing the particulates. With the microfilter, a precoat filter of aluminum chlorohydrate was used. Excellent filtration was achieved without plugging of the pores of the microfilter.

The foregoing disclosure and description of the invention is illustrative and explanatory thereof. Various changes in the details of the described method may be made within the scope of the appended claims without departing from the true spirit of the invention. The present invention should only be limited by the following claims and their legal equivalents.

I claim:

1. A method for the softening of a feedstream of water containing hardness ions and acid gases comprising the steps of:

passing the feedstream of water into intimate contact with uncondensed steam such that the uncondensed steam elevates a temperature of the feedstream of water;

increasing the pH of the feedstream of water;

reacting the feedstream of water with the uncondensed steam so as to increase the temperature of the water to a maximum temperature of between 150° F. and 250° F. and to produce uncondensed steam byproducts including said acid gases and liquid byproducts; stripping said uncondensed steam byproducts from said water; and passing the liquid byproducts through a filter so as to remove solids including said hardness ions from the liquid byproducts.

2. The method of claim 1, said uncondensed steam being reacted with said feedstream of water at a rate of one pound of steam per ten pounds of feedstream water, said uncondensed steam having a pressure of at least 35 psia.

3. The method of claim 1, said step of increasing the pH being prior to said step of reacting.

4. The method of claim 3, said step of increasing the pH comprising the step of:

adding a caustic to the feedstream of water.

5. The method of claim 3, said feedstream of water having a bicarbonate component, said step of reacting comprising the step of:

converting the bicarbonate component into a carbonate component.

6. The method of claim 5, said liquid byproducts having a temperature of between 150° and 220° F. following said step of reacting, said liquid byproducts containing said carbonate component.

7. The method of claim 1, further comprising the step of:

adding a quantity of magnesium hydroxide to said feedstream of water so as to initiate silica crystal formation.

8. The method of claim 1, further comprising the step of:

passing the liquid byproducts through a bed of aluminum prior to said step of passing through a filter so as to reduce a silica content of the liquid byproducts.

9. The method of claim 1, further comprising the step of:

transmitting said uncondensed steam byproducts to a downstream process.

10. The method of claim 1, said step of passing the feedstream of water comprising the steps of:

passing said feedstream of water through a crossflow microfilter tube; and sparging uncondensed steam into an interior of said crossflow microfilter tube from an exterior of the tube.

11. A method for the softening of a feedstream of water containing hardness ions and acid gases comprising the steps of:

passing the feedstream of water into intimate contact with uncondensed steam at a rate of one pound of steam per ten pounds of the feedstream water so as to elevate a temperature of the feedstream of water to a maximum temperature of between 150° F. and 250° F.;

reacting the feedstream of water with the uncondensed steam so as to produce uncondensed steam byproducts including said acid gases and liquid byproducts; stripping said uncondensed steam byproducts from said water; and filtering the liquid byproducts so as to remove solids including said hardness ions from the liquid byproducts.

12. The method of claim 11, further comprising the step of:

increasing the pH of the feedstream of water prior to the step of reacting.

13. The method of claim 12, said step of passing the feedstream of water comprising the steps of:

passing the feedstream of water through a crossflow microfilter tube; and sparging uncondensed steam into an interior of said crossflow microfilter tube from an exterior of the tube through pores formed in the tube.

14. The method of claim 11, the feedstream of water being unheated prior to said step of passing.

15. The method of claim 11, said feedstream of water having a bicarbonate component, said step of reacting comprising the step of:

converting the bicarbonate component into a carbonate component, said carbonate component being in said liquid byproducts; and releasing carbon dioxide from the reaction as the uncondensed steam byproduct.

16. The method of claim 15, said uncondensed steam having a pressure of between 35 to 450 psia, said liquid byproducts having a temperature of between 150° and 220° F. following said step of reacting.

17. The method of claim 11, further comprising the step of:

adding a quantity of magnesium hydroxide to said feedstream of water so as to initiate silica crystal formation.

18. The method of claim 11, further comprising the step of:

passing the liquid byproducts through a bed of aluminum prior to said step of filtering so as to reduce a silica content of the liquid byproducts.

19. A method for the softening of a feedstream of water containing hardness ions and acid gases comprising the steps of:

passing the feedstream of water through a crossflow microfilter tube;

sparging uncondensed steam into an interior of said crossflow microfilter tube from an exterior of the tube through pores formed in the tube, said steam intimately contacting the feedstream of water;

reacting the feedstream of water with the uncondensed steam so as to increase the temperature of the water to a maximum temperature of between 150° F. and 250° F. and produce uncondensed steam byproducts including said acid gases and liquid byproducts, said liquid byproducts having a maximum temperature of between 150° F. and 220° F.; stripping said uncondensed steam byproducts from said water; and filtering the liquid byproducts so as to remove solids from the liquid byproducts.

20. The method of claim 19, said feedstream of water having a carbonate component, said step of reacting further comprising the steps of:

converting the bicarbonate component into a carbonate component at a temperature of below 225° F.; and releasing carbon dioxide as an uncondensed steam byproduct.

* * * * *